US009875765B2

(12) United States Patent
Yukimatsu et al.

(10) Patent No.: US 9,875,765 B2
(45) Date of Patent: Jan. 23, 2018

(54) BASE FOR MAGNETIC RECORDING MEDIUM

(71) Applicant: SHOWA DENKO K.K., Tokyo (JP)

(72) Inventors: Koji Yukimatsu, Tochigi (JP); Isao Murase, Tochigi (JP); Kiminori Sugimoto, Osaka (JP); Tomoya Kobayashi, Tochigi (JP)

(73) Assignee: SHOWA DENKO K.K., Tokyo (JP)

( * ) Notice: Subject to any disclaimer, the term of this patent is extended or adjusted under 35 U.S.C. 154(b) by 16 days.

(21) Appl. No.: 15/271,359

(22) Filed: Sep. 21, 2016

(65) Prior Publication Data

US 2017/0186458 A1    Jun. 29, 2017

(30) Foreign Application Priority Data

Dec. 25, 2015    (JP) .................................. 2015-253174

(51) Int. Cl.
*G11B 5/73*    (2006.01)
*C22C 21/04*    (2006.01)
*C22C 21/08*    (2006.01)

(52) U.S. Cl.
CPC ............ *G11B 5/7315* (2013.01); *C22C 21/04* (2013.01); *C22C 21/08* (2013.01)

(58) Field of Classification Search
None
See application file for complete search history.

(56) References Cited

U.S. PATENT DOCUMENTS

| | | | | |
|---|---|---|---|---|
| 4,077,810 A | * | 3/1978 | Ohuchi | C22C 21/04 148/439 |
| 4,163,266 A | * | 7/1979 | Tamamura | C22C 21/02 360/130.21 |
| 4,412,870 A | * | 11/1983 | Vernam | C22C 21/06 148/439 |
| 4,826,737 A | * | 5/1989 | Yamada | C22C 21/06 148/522 |
| 5,028,393 A | * | 7/1991 | Tanaka | C22C 21/003 148/439 |
| 5,707,705 A | * | 1/1998 | Nelson | G11B 5/7315 204/192.1 |

(Continued)

FOREIGN PATENT DOCUMENTS

| | | |
|---|---|---|
| JP | 2009-024265 | 2/2009 |
| JP | 2015-026414 | 2/2015 |
| WO | WO-2016068293 A1 * | 5/2016 ............. C22C 21/00 |

OTHER PUBLICATIONS

Derwent Abstract of WO 2016/068293 A1 (Year: 2016).*
Machine Translation of JP 6,014,785 B (Year: 2106).*

*Primary Examiner* — Kevin M Bernatz
(74) *Attorney, Agent, or Firm* — IPUSA, PLLC

(57) ABSTRACT

A base for a magnetic recording medium includes, a substrate made of an Al alloy, and a film made of a NiP-based alloy and provided on the substrate. The Al alloy of the substrate includes Mg in a range of 0.2 mass % to 6 mass %, Si in a range of 3 mass % to 17 mass %, Zn in a range of 0.05 mass % to 2 mass %, and Sr in a range of 0.001 mass % to 1 mass %. An average grain diameter of Si grains in an alloy structure of the substrate is 2 μm or less. The film has a thickness of 10 μm or greater. The substrate has an outer diameter of 53 mm or greater, a thickness of 0.9 mm or less, and a Young's modulus of 79 GPa or higher.

4 Claims, 1 Drawing Sheet

(56) References Cited

U.S. PATENT DOCUMENTS

| | | | | |
|---|---|---|---|---|
| 6,124,039 A * | 9/2000 | Goetz | ................... | C22C 21/00 |
| | | | | 216/102 |
| 6,316,097 B1 * | 11/2001 | Liu | ..................... | G11B 5/732 |
| | | | | 204/192.2 |
| 6,332,906 B1 * | 12/2001 | Haynes | ................... | B22F 3/20 |
| | | | | 419/28 |
| 8,404,369 B2 * | 3/2013 | Ruffini | ................. | G11B 5/653 |
| | | | | 427/419.1 |
| 9,038,704 B2 * | 5/2015 | Williamson | ........... | B22D 21/04 |
| | | | | 164/113 |
| 9,613,648 B2 * | 4/2017 | Kitawaki | ............ | C23C 18/1651 |
| 2003/0143102 A1 * | 7/2003 | Matsuoka | ............... | C22C 21/04 |
| | | | | 420/546 |
| 2005/0238929 A1 * | 10/2005 | Uwazumi | .............. | G11B 5/667 |
| | | | | 428/848 |
| 2008/0318081 A1 * | 12/2008 | Steins | ................... | C22C 21/02 |
| | | | | 428/640 |
| 2017/0327930 A1 * | 11/2017 | Kitawaki | ............... | C22C 21/02 |

* cited by examiner

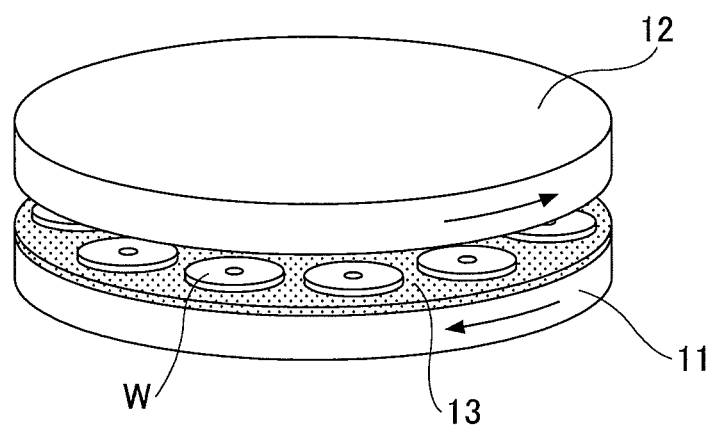

BASE FOR MAGNETIC RECORDING MEDIUM

CROSS-REFERENCE TO RELATED APPLICATIONS

This application is based upon and claims the benefit of priority of Japanese Patent Application No. 2015-253174 filed on Dec. 25, 2015, the entire contents of which are incorporated herein by reference.

BACKGROUND OF THE INVENTION

1. Field of the Invention

The present invention relates to a base for a magnetic recording medium.

2. Description of the Related Art

There are demands to considerably improve a recording density (or storage capacity) of a magnetic recording medium that is used in a hard disk drive. Particularly, introduction of a MR (Magneto-Resistive) head and the PRML (Partial Response Maximum Likelihood) technique has further improved an in-plane recording density of the magnetic recording medium.

On the other hand, due to recent developments in areas of the Internet and big data utilization, a data storage capacity of a data center continues to increase. Due to space limitations at the data center, there are demands to increase the storage capacity per unit volume. In other words, in order to increase the storage capacity of one standardized hard disk drive, there are proposals to increase a number of magnetic recording media accommodated within a casing of a standardized hard disk drive.

An Al alloy substrate or a glass substrate is primarily used as the base for the magnetic recording medium. Compared to the glass substrate, the Al alloy substrate has a higher toughness and more manufacturing ease, and thus, the Al alloy substrate is used for the magnetic recording medium having a relatively large diameter. A thickness of the Al alloy substrate used for the magnetic recording medium of a 3.5-inch standardized hard disk drive is 1.27 mm, for example.

However, when the thickness of the base used for the magnetic recording medium is reduced, fluttering more easily occurs in the case in which the Al alloy substrate is used when compared to the case in which the glass substrate is used. Fluttering of the magnetic recording medium occurs when the magnetic recording medium is rotated at a high speed. When the fluttering occurs, it becomes difficult to stably read information from the magnetic recording medium within the hard disk drive. In the case in which the glass substrate is used, for example, the base for the magnetic recording medium is made of a material having a high Young's modulus in order to suppress the fluttering, as proposed in Japanese Laid-Open Patent Publication No. 2015-26414, for example.

Generally, the Al alloy substrate is manufactured as follows. First, an Al alloy plate having a thickness on the order of 2 mm or less is formed into a donut-shaped substrate having a desired size by punching. Next, inner and outer peripheral edges of the donut-shaped substrate are chamfered, and data recording surfaces of the donut-shaped substrate are subjected to machining by rotation. Surface roughness and undulation of the data recording surfaces are reduced by grinding using a honing stone. Thereafter, from a viewpoint of providing surface hardness and suppressing surface defects, the substrate surfaces are NiP-plated. Next, both substrate surfaces (or data recording surfaces), having a NiP-plated film, are subjected to polishing. The base for the magnetic recording medium is a mass-produced product, and a high cost performance is desired of the base. For this reason, a high machinability and a low cost are desired of the Al alloy used for the base.

For example, Japanese Laid-Open Patent Publication No. 2009-24265 proposes a material having a high machinability and capable of suppressing damage such as frictional wear, chipping, or the like to a cutting tool. The proposed material is an Al alloy having a satisfactory anodizable property, and includes 0.3 mass % to 6 mass % of Mg, 0.3 mass % to 10 mass % of Si, 0.05 mass % to 1 mass % of Zn, and 0.001 mass % to 0.3 mass % of Sr, with the remainder being Al and impurities.

Accordingly, it is difficult to reduce a thickness of the base for the magnetic recording medium and obtain a high Young's modulus.

SUMMARY OF THE INVENTION

Embodiments of the present invention can provide a base for a magnetic recording medium, having a thickness that can be reduced and a high Young's modulus.

According to one aspect of the present invention, a base for a magnetic recording medium includes, a substrate made of an Al alloy, and a film made of a NiP-based alloy and provided on the substrate, wherein the Al alloy of the substrate includes Mg in a range of 0.2 mass % to 6 mass %, Si in a range of 3 mass % to 17 mass %, Zn in a range of 0.05 mass % to 2 mass %, and Sr in a range of 0.001 mass % to 1 mass %, wherein an average grain diameter of Si grains in an alloy structure of the substrate is 2 μm or less, wherein the film has a thickness of 10 μm or greater, and wherein the substrate has an outer diameter of 53 mm or greater, a thickness of 0.9 mm, and a Young's modulus of 79 Gpa or highger.

BRIEF DESCRIPTION OF THE DRAWINGS

FIG. 1 is a perspective view for explaining an example of a method of manufacturing a base for a magnetic recording medium in accordance with one embodiment of the present invention.

DESCRIPTION OF THE PREFERRED EMBODIMENTS

A description will be given of embodiments and exemplary implementations of a base for a magnetic recording medium according to the present invention, by referring to the drawing.

In one embodiment of the present invention, the base for the magnetic recording medium includes a disk-shaped substrate made of an Al alloy and having an opening at a center thereof, and a NiP-based alloy film plated on a surface of the disk-shaped substrate. The magnetic recording medium using this base includes a magnetic layer, a protection layer, a lubricant layer, or the like that are successively stacked on a surface of this base. A hard disk drive using this magnetic recording medium includes a casing to accommodate this magnetic recording medium, a spindle motor, a magnetic head, or the like. A center part of the magnetic recording medium is mounted on a rotary shaft of the spindle motor, and the magnetic head floats on a surface of the magnetic recording medium that is driven and rotated by the spindle motor. The floating magnetic head writes information to and reads information from the surface of the magnetic recording medium. A pair of magnetic heads may be used to write information to and read information from both surfaces of the magnetic recording medium. In addition, a plurality of magnetic recording media may be accommodated within the casing. The hard disk drive may have a known configuration.

In the hard disk drive, the magnetic recording medium is rotated at a high speed of 5000 rpm or higher. For this reason, when the magnetic recording medium has poor mechanical properties, fluttering of the magnetic recording medium occurs to make it difficult to stably read information from the magnetic recording medium within the hard disk drive. The present inventors conceived that the fluttering of the magnetic recording medium and the Young's modulus of the magnetic recording medium are interrelated, that is, closely related. The present inventors also conceived that the fluttering can be reduced by increasing the Young's modulus of the magnetic recording medium, and that by setting the Young's modulus of the base for the magnetic recording medium to 79 GPa or higher, it is possible to manufacture a magnetic recording medium having an outer diameter of 53 mm or greater and a thickness of 0.9 mm or less.

In one embodiment, the base for the magnetic recording medium includes a substrate made of an Al alloy, and the Al alloy substrate composition includes Mg in a range of 0.2 mass % to 6 mass %, and preferably in a range of 0.3 mass % to 5 mass %, Si in a range of 3 mass % to 17 mass %, and preferably in a range of 4 mass % to 10 mass %, Zn in a range of 0.05 mass % to 2 mass %, and preferably in a range of 0.1 mass % to 1 mass %, and Sr in a range of 0.001 mass % to 1 mass %, and preferably in a range of 0.005 mass % to 0.3 mass %. An average grain diameter of Si grains in the alloy structure of the Al alloy substrate is 2 µm or less, and preferably 1.5 µm or less. In one embodiment, the 4 elements Mg, Si, Zn, and Sr added to the Al alloy of the substrate are essential added elements, with the remainder of the Al alloy being Al and inevitable or unavoidable impurities.

In one embodiment, it is possible to dramatically increase the Young's modulus of the Al alloy substrate because the Al alloy substrate composition includes a large amount of Si. However, a large amount of Si grains are dispersed within the Al alloy that includes the large amount of Si, and depending on manufacturing conditions, these Si grains may finally grow to a grain size of 5 µm to 10 µm, for example. In addition, when such Si grains exist within the Al alloy substrate, there are cases in which a NiP-based plated film that is provided on the surface of the Al alloy substrate is not plated uniformly, and a film quality of the NiP-based plated film becomes non-uniform.

In order to prevent the NiP-based film from being plated non-uniformly on the surface of the Al alloy substrate and prevent the film quality of the NiP-based plated film from becoming non-uniform, Sr is added to the Al alloy substrate composition in one embodiment, so that the added Sr causes balling up and size reduction of Sr grains, to thereby enable the NiP-based film to be uniformly plated on the surface of the Al alloy substrate with a uniform film quality. In addition, in one embodiment, the balling up and size reduction of the Sr gains have the effect of improving machinability of the Al alloy substrate.

Next, a more detailed description will be given of each of the added elements added to the Al alloy of the Al alloy substrate.

Mg is solved in an alloy matrix and bonds to excessive Si or the like, to form precipitation such as $Mg_2Si$ or the like that is dispersed within the matrix. As a result, the mechanical properties such as the Yong's modulus or the like are improved, and cutting properties of the alloy are further improved due to synergy effect with other solid solution elements. The above described effect is small when the Mg-content is less than 0.2 mass %. On the other hand, oxidation of alloy liquid is promoted and plastic workability deteriorates when the Mg-content exceeds 6 mass %.

Si is dispersed within the alloy matrix as free grains of Si, excluding an amount required to form a compound due to the small amount of solid solution into the Al. In the alloy structure in which the Si grains are dispersed, scraping by grinding of the Si grains by a cutting tool, or interfacial peeling between the Si grains and the Al parent phase, quickly provides scission to improve the cutting properties. In addition, the essential element Sr that is added, or Na, Ca, or the like that are added arbitrarily, causes the balling up and size reduction of the Si grains, to thereby also improve the cutting properties. When the Si-content is less than 3 mass %, the effect of increasing the Young's modulus of the alloy decreases, and the effect of improving the scission by the scraping deteriorates. On the other hand, when the Si-content exceeds 17 mass %, the scission by the scraping improves, however, the frictional wear of the cutting tool becomes notable to deteriorate a productivity of the base for the magnetic recording medium.

Zn is solved in the alloy matrix, and bonds to Mg, to form precipitation such as $MgZn_2$ or the like that is dispersed within the matrix. For this reason, the mechanical properties of the Al alloy is improved, and the cutting properties of the alloy are improved due to synergy effect with other solid solution elements. The above described effect is small when the Zn-content is less than 0.05 mass %. On the other hand, corrosion resistance may deteriorate when the Zn-content exceeds 2 mass %.

By coexisting with Si, Sr causes balling up and size reduction of pro-eutectic Si and eutectic Si at the time of solidification to a diameter of 2 µm or less, and preferably 1.5 µm or less. For this reason, Sr coexisting with Si has the effect of indirectly improving the scission by the scraping to improve the cutting properties, and to suppress the frictional wear and damage to the cutting tool. In addition, Sr has the effect of uniformly and finely dispersing the Si grains in the process such as continuous casting, extrusion, drawing, or the like, to further improve the cutting properties. Furthermore, the structure of the NiP-based plated film provided on the Al alloy substrate becomes uniform, and the film quality of the NiP-based plated film also becomes uniform. In other words, in a case in which the conventional Al alloy including a large amount of Si is used for the base for the magnetic recording medium, the NiP-based plated film is uneasily formed on the surface of the Si grains, and consequently, defects, such as dents, pits, or the like, are easily formed at surface locations on the Si grains where the NiP-based plated film is not formed. On the other hand, one embodiment eliminates these problems that are encountered in the case in which the conventional Al alloy including the large amount of Si is used for the base for the magnetic recording medium, and can provide a base for the magnetic recording medium having a uniform plated film on the substrate.

When the Sr-content is less than 0.001 mass %, the above described effect deteriorates, and the balling up of the Si grains may not occur to generate acute-angled portions, to notably increase the frictional wear of the cutting tool. On the other hand, when the Sr-content exceeds 1 mass %, the above described effect saturates, and the significance of adding a large amount of Sr deteriorates. In addition, in this latter case, the NiP-based plated film is uneasily famed because crystallization of pro-eutectic $SrAl_4$ occurs, and defects, such as dents, pits, or the like, are easily formed at surface locations where the NiP-based plated film is not formed.

Other added elements that may be appropriately added to the Al alloy of the Al alloy substrate include Fe, Cu, Mn, Cr, Ti, Pb, Bi, Zr, B, V, Na, and Ca. An added content of each of these added elements Fe, Cu, Mn, Cr, Ti, Pb, Bi, Zr, B, V, Na, and Ca is preferably 1 mass % or less, or zero (that is, not added). A total amount of these added elements Fe, Cu, Mn, Cr, Ti, Pb, Bi, Zr, B, V, Na, and Ca is preferably 4 mass % or less. The effects of adding these added elements Fe, Cu, Mn, Cr, Ti, Pb, Bi, Zr, B, V, Na, and Ca include an improvement to castability (for example, fluidity, shrinkage, and casting-crack resistance), an improvement to mechanical properties, an improvement to machinability (for example, cutting), and an improvement to crystal grain refining, as is generally known for 4000-series aluminum silicon alloys. On the other hand, it is not preferable for the added content of each of these added elements Fe, Cu, Mn, Cr, Ti, Pb, Bi, Zr, B, V, Na, and Ca to exceed 1 mass %, or the total amount of these added elements Fe, Cu, Mn, Cr, Ti, Pb, Bi, Zr, B, V, Na, and Ca to exceed 4 mass %, because the effects of adding the essential added elements Mg, Si, Zn and Sr are deteriorated thereby. Particularly, in order to emphasize the effects of adding the essential added elements Mg, Si, Zn, and Sr, the added content of each of these added elements Fe, Cu, Mn, Cr, Ti, Pb, Bi, Zr, B, V, Na, and Ca is preferably 0.5 mass % or less, and more preferably 0.1 mass % or less.

In one embodiment, the Al alloy substrate can be manufactured according to a known method. For example, a composition-adjusted alloy material is heated, melted, and casted. Thereafter, the composition-adjusted alloy material is subjected to rolling and annealing, and formed into a disk-shaped plate having prescribed dimensions and an opening at a center thereof.

In one embodiment, an outer diameter of the Al alloy substrate is 53 mm or greater. As described above, the Al alloy substrate in one embodiment may be used for the purposes of increasing the number of magnetic recording media accommodated within the casing of the standardized hard disk drive. That is, the Al alloy substrate is required to be accommodatable within the casing of the 2.5-inch hard disk drive, the 3.5-inch hard disk drive, or the like. A maximum diameter of the substrate used in the 2.5-inch hard disk drive is approximately 67 mm, and a maximum diameter of the substrate used in the 3.5-inch hard disk drive is approximately 97 mm. Hence, in one embodiment, the outer diameter of the Al alloy substrate is required to be at least 53 mm or greater.

In one embodiment, the base for the magnetic recording medium has the NiP-based plated film having a thickness of 10 μm or greater provided on the surface of the substrate. The thickness of the NiP-based plated film used in the conventional base for the magnetic recording medium is less than 10 μm. However, in one embodiment, the thickness of the NiP-based plated film is 10 μm or greater, so that the Young's modulus of the base for the magnetic recording medium is improved to 79 GPa or higher.

In one embodiment, the NiP alloy is used for the NiP-based plated film, and the NiP alloy preferably includes P in a range of 15 mass % to 35 mass %, and inevitable or unavoidable impurities, with the remainder being Ni. By forming the NiP-based plated film to have such a structure, it is possible to increase the Young's modulus of the base for the magnetic recording medium when compared to the base for the magnetic recording medium before the NiP-based plated film is provided on the Al alloy substrate.

In one embodiment, a NiWP-based alloy is used for the NiP-based plated film, and the NiWP-based alloy preferably includes W in a range of 15 mass % to 22 mass %, P in a range of 3 mass % to 10 mass %, added elements that are appropriately added, and inevitable or unavoidable impurities, with the remainder being Ni. By forming the NiP-based plated film to have such a structure, it is possible to further increase the Young's modulus of the base for the magnetic recording medium.

A NiWP-based plated film may be formed using a method similar to the conventional method used for forming the NiP-based plated film. For example, a plating solution that is obtained by adding tungsten salt to a NiP plating solution may be used to form the NiWP-based plated film. Tungsten salt may include sodium tungstate, potassium tungstate, ammonium tungstate, or the like. The plated film is preferably plated by electroless plating. A thickness of the plated film may be adjusted according to an immersion time of the substrate into the plating solution, and a temperature of the plating solution. Plating conditions are not limited to particular conditions, however, a pH of a plating bath is preferably 5.0 to 8.6, a bath temperature is preferably 70° C. to 100° C., and more preferably 85° C. to 95° C., and the immersion time is preferably 90 minutes to 150 minutes.

A heat treatment is preferably performed after forming the plated film on the substrate. By setting a heat treatment temperature to 300° C. or higher, it is possible to increase a hardness of the plated film, and further increase the Young's modulus of the base for the magnetic recording medium.

According to the method of manufacturing the base for the magnetic recording medium in one embodiment, the Al alloy substrate is plated, and the surface of this plated substrate is thereafter polished. In addition, in one embodiment, from a viewpoint of simultaneously improving the surface quality, such as forming a smooth surface and reducing surface damage, and improving the productivity, it is preferable to employ a multi-stage polishing using a plurality of independent grinders and including 2 or more polishing stages.

More particularly, the process of polishing the surface of the base (hereinafter also referred to as "base surface") for the magnetic recording medium may include a coarse polishing stage that polishes the base surface using a first grinder while supplying a polishing agent that includes alumina abrasive grains, and a finishing stage that washes the base for the magnetic recording medium and thereafter finishes the base surface using a second grinder while supplying a polishing agent that includes colloidal silica grains.

The first and second grinders may include a pair of tables, namely, upper and lower tables 11 and 12, as illustrated in FIG. 1. FIG. 1 is a perspective view for explaining an example of the method of manufacturing the base for the magnetic recording medium in accordance with one embodiment of the present invention. The upper and lower tables 11 and 12 rotate in mutually opposite directions as indicated by arrows in FIG. 1, while sandwiching a plurality of bases W between the upper and lower tables 11 and 12. Both surfaces of each of the bases W are polished by polishing pads 13 provided on the upper and lower tables 11 and 12, respectively.

Next, a description will be given of exemplary implementations according to the present invention, together with comparison examples.

[Manufacturing Al Alloy Substrate]

Table 1 illustrates composition-adjusted alloy materials used for the Al alloy substrate in each of exemplary implementations EI1 through EI12 and comparison examples CE1 through CE7. Each composition-adjusted alloy is manufactured by direct-chill casting at a casting rate of 80 mm/minute. A cast ingot that is manufactured from each composition-adjusted alloy is held at 520° C. for 10 hours for homogenizing, and is thereafter subjected to rolling to form a plate member having a thickness of 1.2 mm. Then, this plate member is punched into a disk-shaped plate (or substrate) having an outer diameter of 97 mm and an opening at a center thereof. Top, bottom, and end surfaces of the disk-shaped plate are subjected to machining by rotation using a diamond bit, to form an Al alloy substrate having an outer diameter of 96 mm and a thickness of 0.8 mm. A crystal structure of each Al alloy substrate is observed, and the Si grain diameter is measured. Measured results for the Al alloy substrates according to the exemplary implementations EI1 through EI12 and the comparison examples CE1 through CE7 are illustrated in Table 1. In other words, Table 1 illustrates the Al alloy composition (mass %), the Si grain diameter (μm), the plated film composition, the Young's modulus (GPa), the surface smoothness, and the fluttering (μm) for the exemplary implementations EI1 through EI12 and the comparison examples CE1 through CE7.

stage of the polishing. A polishing time for each of the first, second, and third stages of the polishing is 5 minutes.

[Evaluation]

The Young's modulus of each base for the magnetic recording medium, manufactured as described above, is measured. In addition, the surface of each base for the magnetic recording medium is observed by a differential interference optical microscope with a magnification of 1000 times. The observed surface smoothness of each base for the magnetic recording medium is illustrated as the "Surface Smoothness" in Table 1. For the surface smoothness (or evenness) illustrated in Table 1, a double circle mark indicates a superior surface smoothness, a single circle mark indicates a satisfactory surface smoothness, and a cross mark indicates an unsatisfactory surface smoothness.

In addition, each base for the magnetic recording medium, manufactured as described above, is rotated at 10000 rpm, and the fluttering occurring at an outermost peripheral surface of each base for the magnetic recording medium is measured using a He—Ne laser displacement gauge. The measured fluttering is illustrated as "Fluttering (μm)" in Table 1.

It is confirmed from Table 1 that, according to the exemplary implementations EI1 through EI12, the Young's modulus of each base for the magnetic recording medium is high, and the Si grain diameter within the Al alloy structure

TABLE 1

| | Al Alloy Composition (mass %) | | | | Si Grain Diameter | Plated Film Composition | Young's Modulus (GPa) | Surface Smoothness | Fluttering (μm) |
|---|---|---|---|---|---|---|---|---|---|
| | Mg | Si | Zn | Sr | Al | (μm) | | | | |
| EI1 | 1.10 | 8.00 | 0.30 | 0.04 | Remainder | 1.0 | Ni76P24 | 80 | ◎ | 3.3 |
| EI2 | 1.10 | 8.00 | 0.30 | 0.04 | Remainder | 1.0 | Ni76W19P5 | 82 | ◎ | 3.2 |
| EI3 | 0.32 | 8.10 | 0.40 | 0.04 | Remainder | 0.8 | Ni76P24 | 81 | ◎ | 3.3 |
| EI4 | 0.32 | 8.10 | 0.40 | 0.04 | Remainder | 0.8 | Ni76W19P5 | 83 | ◎ | 3.2 |
| EI5 | 4.75 | 7.90 | 0.31 | 0.04 | Remainder | 1.7 | Ni76P24 | 79 | ○ | 3.4 |
| EI6 | 1.07 | 9.98 | 0.31 | 0.04 | Remainder | 1.6 | Ni76P24 | 82 | ○ | 3.4 |
| EI7 | 1.07 | 9.98 | 0.31 | 0.04 | Remainder | 1.6 | Ni76W19P5 | 84 | ○ | 3.2 |
| EI8 | 1.10 | 8.00 | 0.12 | 0.03 | Remainder | 0.9 | Ni76P24 | 80 | ◎ | 3.3 |
| EI9 | 1.10 | 8.00 | 0.12 | 0.03 | Remainder | 0.9 | Ni76W19P5 | 82 | ◎ | 3.3 |
| EI10 | 1.09 | 7.98 | 0.92 | 0.04 | Remainder | 1.1 | Ni76P24 | 79 | ○ | 3.4 |
| EI11 | 1.10 | 8.01 | 0.31 | 0.003 | Remainder | 1.8 | Ni76P24 | 80 | ○ | 3.4 |
| EI12 | 1.08 | 7.97 | 0.29 | 0.30 | Remainder | 1.7 | Ni76P24 | 80 | ○ | 3.4 |
| CE1 | 0.10 | 8.00 | 0.29 | 0.03 | Remainder | 0.8 | Ni76P24 | 77 | ○ | 3.7 |
| CE2 | 6.40 | 8.02 | 0.31 | 0.04 | Remainder | 3.0 | Ni76P24 | 81 | X | 5.1 |
| CE3 | 1.10 | 2.50 | 0.30 | 0.03 | Remainder | 0.9 | Ni76P24 | 72 | ◎ | 3.9 |
| CE4 | 1.10 | 17.20 | 0.30 | 0.04 | Remainder | 15.0 | Ni76P24 | 83 | X | 6.3 |
| CE5 | 1.10 | 8.04 | 0.00 | 0.04 | Remainder | 1.0 | Ni76P24 | 78 | ◎ | 3.7 |
| CE6 | 1.10 | 7.98 | 0.30 | 0.00 | Remainder | 4.2 | Ni76P24 | 79 | X | 4.9 |
| CE7 | 1.09 | 8.00 | 0.31 | 1.10 | Remainder | 3.5 | Ni76P24 | 80 | X | 4.9 |

[Forming Plated Film by Electroless Plating]

For each of the Al alloy substrates made of the composition-adjusted alloys (that is, Al alloy compositions), a NiP-plated film having a thickness of 10 μm is plated using a corresponding plated film composition illustrated in Table 1. The heat treatment temperature after the plating is performed for 3 minutes at 300° C. for the NiP-based plated films and at 400° C. for the NiWP-based plated films.

[Polishing Process]

A 3-stage lapping machine having a pair of tables, namely, upper and lower tables, is used for the grinder. A suede type pad (manufactured by Filwel Co., Ltd.) is used for polishing pads of the pair of tables of the grinder. Alumina grains having a D50 value of 0.5 μm is used for a first stage of the polishing, colloidal silica grains having a D50 value of 30 nm is used for a second stage of the polishing, and colloidal silica grains having a D50 value of 10 nm is used for a third of each base for the magnetic recording medium is small. Hence, according to the exemplary implementations EI1 through EI12, it is confirmed from Table 1 that the surface smoothness of the plated film of each base for the magnetic recording medium is superior or satisfactory. For this reason, according to the exemplary implementations EI1 through EI12, it is confirmed from Table 1 that the fluttering of each base for the magnetic recording medium when rotated at a high speed is small.

On the other hand, it is confirmed from Table 1 that, according to the comparison examples CE1, CE3, and CE5, the Young's modulus of each base for the magnetic recording medium is low, and the fluttering of each base for the magnetic recording medium when rotated at the high speed is large. In addition, it is confirmed from Table 1 that, according to the comparison examples CE2, CE4, CE6, and CE7, the Si grain diameter is large, pits or the like are formed on the plated film surface, and the surface smoothness of the base surface is poor. Particularly according to the comparison example CE7, crystallization of pro-eutectic SrAl$_4$ is confirmed. It may be regarded that the fluttering is large for the comparison examples CE2, CE4, CE6, and CE7 because of the pits or the like formed on the plated film surface.

According to the embodiments and exemplary implementations described above, it is possible to provide a base for a magnetic recording medium, having a thickness that can be reduced and a high Young's modulus. For this reason, it is possible to increase a number of magnetic recording media that can be accommodated within a casing of a standardized hard disk drive, and provide a high recording capacity (or high storage capacity). Furthermore, because the Young's modulus of the base is high, the machinability of the base can be improved when manufacturing the magnetic recording medium.

Further, the present invention is not limited to these embodiments and exemplary implementations, but various variations and modifications may be made without departing from the scope of the present invention.

What is claimed is:

1. A base for a magnetic recording medium, comprising:
   a substrate made of an Al alloy; and
   a film made of a NiP-based alloy and provided on the substrate,
   wherein the Al alloy of the substrate includes Mg in a range of 0.2 mass % to 6 mass %, Si in a range of 3 mass % to 17 mass %, Zn in a range of 0.05 mass % to 2 mass %, and Sr in a range of 0.001 mass % to 1 mass %,
   wherein an average grain diameter of Si grains in an alloy structure of the substrate is 2 μm or less,
   wherein the film has a thickness of 10 μm or greater, and
   wherein the substrate has an outer diameter of 53 mm or greater, a thickness of 0.9 mm or less, and a Young's modulus of 79 GPa or higher.

2. The base for the magnetic recording medium as claimed in claim 1, wherein the film is made of a NiP-based alloy that includes P in a range of 15 mass % to 35 mass %.

3. The base for the magnetic recording medium as claimed in claim 1, wherein the film is made of a NiWP-based alloy that includes W in a range of 15 mass % to 22 mass %, and P in a range of 3 mass % to 10 mass %.

4. The base for the magnetic recording medium as claimed in claim 1, which is a plated-base having the film plated on the substrate.

* * * * *